(12) United States Patent
Kondylis et al.

(10) Patent No.: US 7,706,338 B2
(45) Date of Patent: Apr. 27, 2010

(54) METHOD AND SYSTEM FOR A BANDWIDTH EFFICIENT MEDIUM ACCESS CONTROL (MAC) PROTOCOL

(75) Inventors: George D. Kondylis, Palo Alto, CA (US); Ling Su, Cupertino, CA (US); Neal Nuckolls, Mountain View, CA (US); Bruce E. Edwards, Belmont, MA (US); Matthew J. Fischer, Mountain View, CA (US); Jason Trachewsky, Menlo Park, CA (US); Stephen R. Palm, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1208 days.

(21) Appl. No.: 11/181,548

(22) Filed: Jul. 14, 2005

(65) Prior Publication Data
US 2006/0153152 A1 Jul. 13, 2006

Related U.S. Application Data

(60) Provisional application No. 60/638,677, filed on Dec. 23, 2004.

(51) Int. Cl.
*H04W 4/00* (2009.01)
(52) U.S. Cl. ..................... 370/338; 370/445

(58) Field of Classification Search ............ 370/394, 370/338, 349, 445, 447–450
See application file for complete search history.

(56) References Cited

U.S. PATENT DOCUMENTS

2005/0135284 A1* 6/2005 Nanda et al. ............. 370/294
2005/0238054 A1* 10/2005 Sharma .................... 370/473

OTHER PUBLICATIONS

B.P. Crow, I. Widjaja, J.G. Kim and P.T. Sakai, IEEE 802.11 Wireless Local Area Networks, IEEE Communications Magazine, Sep. 1997, pp. 116-126.

* cited by examiner

*Primary Examiner*—Derrick W Ferris
*Assistant Examiner*—Nihar Patel
(74) *Attorney, Agent, or Firm*—McAndrews, Held & Malloy, Ltd.

(57) ABSTRACT

A method and system for a bandwidth efficient medium access control (MAC) protocol is provided, which may comprise communicating a request to transmit (RTS) signal to a receiving station to determine if a channel is available for transmission. A clear to send (CTS) acknowledgement signal may be received from the receiving station if the channel is available for transmission. A plurality of medium access control (MAC) protocol data unit (MPDU) fragments separated by a point coordination function (PCF) interframe space (PIFS) interval may be transmitted in response to the received CTS acknowledgement signal.

27 Claims, 12 Drawing Sheets

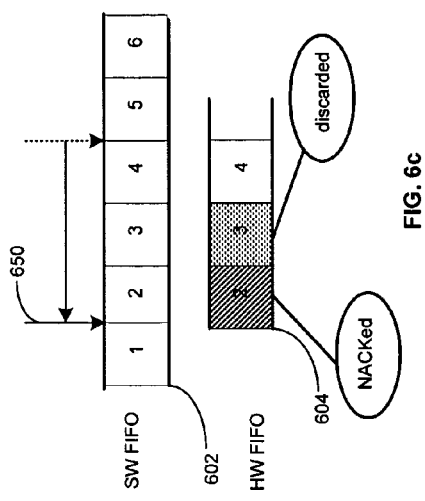
FIG. 6c
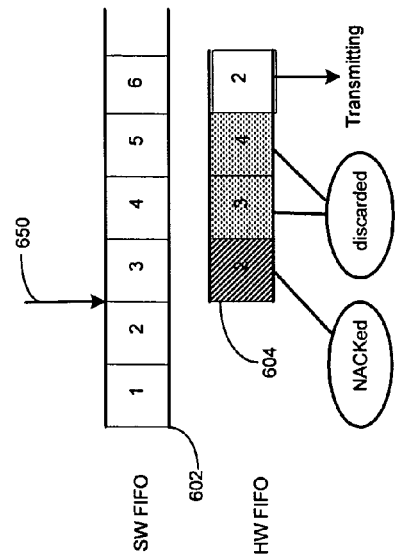
FIG. 6d
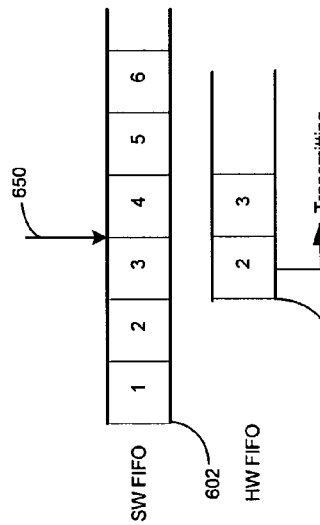
FIG. 6a
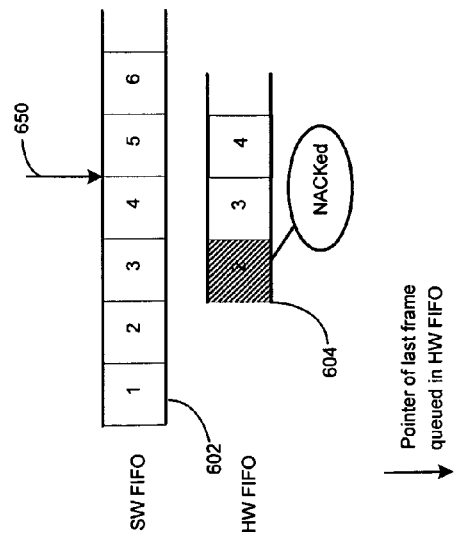
FIG. 6b
FIG. 6

METHOD AND SYSTEM FOR A BANDWIDTH EFFICIENT MEDIUM ACCESS CONTROL (MAC) PROTOCOL

CROSS-REFERENCE TO RELATED APPLICATIONS/INCORPORATION BY REFERENCE

This patent application makes reference to, claims priority to and claims benefit from U.S. Provisional Patent Application Ser. No. 60/638,677 filed on Dec. 23, 2004.

The above application is hereby incorporated herein by reference in its entirety.

FIELD OF THE INVENTION

Certain embodiments of the invention relate to low-level communication protocols. More specifically, certain embodiments of the invention relate to a method and system for a bandwidth efficient medium access control (MAC) protocol.

BACKGROUND OF THE INVENTION

The IEEE 802.11 protocol provides support for two different medium access control (MAC) mechanisms that may be utilized for transporting asynchronous and time bounded services. The first mechanism is distributed coordination function (DCF) and the second is point coordination function (PCF). The distributed coordination function utilizes best effort for facilitating communication of information in which access devices with information to transmit have an equal opportunity to transmit information. The point coordination function may be utilized to communicate time sensitive or latency sensitive information. In this regard, the point coordination function utilizes a polling mechanism, which may be controlled by an access point (AP).

The standard distributed coordination function for medium access may be inefficient in terms of bandwidth utilization, especially at higher physical layer (PHY) speeds, for example, 54 Mbps or higher. The DCF may be adapted to solve problems such as network congestion and high packet error rate (PER) typically associated with some wireless links. The DCF may also exponentially increase backoff and positive acknowledgments (PACKs). The backoff time for each MAC protocol data unit (MPDU) may increase exponentially for retransmissions and the PACK for each MPDU may render bandwidth utilization inefficient at high physical layer (PHY) speeds. Furthermore, When DCFs are utilized without request to send (RTS)/clear to send (CTS) acknowledgement signals, it may not be possible to distinguish between collisions and errors. As a result, larger backoffs than necessary are required. The RTS/CTS mechanism when utilized in conjunction with regular DCF, may diminish efficiency even more, and as a result, may be rarely utilized. For example, in a case where no RTS/CTS is utilized, transmitting a 1500 byte frame including MAC header at 54 Mbps takes 248 μs. The sum of the average backoff, PACK and the short interframe space (SIFS) takes 130 μs, when PACK is transmitted at 24 Mbps. The overhead air time may be more than half the data air time.

The distributed coordination function may not be the most bandwidth efficient transport mechanism. The IEEE 802.11 standard defines a bursting method for MAC protocol data units (MPDUs), called fragmentation. In this regard, MAC service data units (MSDU) may be fragmented at the MAC level to a number of smaller MPDUs. The individual MPDUs comprising one MSDU may be transmitted in a "burst", in which the interframe spacing is a SIFS. Hence, a typical frame exchange sequence under fragmentation would be DATA-SIFS-PACK-DATA-SIFS-PACK, for example, with an optional RTS/CTS exchange in the beginning. However, fragmentation was defined in the 802.11 standard as a means to combat unreliable wireless links having high packet error rates (PER). In reliable wireless links, that is, those with low packet error rates, fragmentation may decrease MAC efficiency, since it introduces MAC headers on each MPDU, and SIFS intervals between MPDUs.

The IEEE 802.11e draft standard defines block acknowledgement policies that eliminate the need for individual acknowledgements (PACKs) for each MPDU. However, this block PACK mechanism introduces extra overhead comprising block PACK request frames and block PACK response frames. The IEEE 802.11e draft standard also defines contention free periods of time allocated to specific devices, where frames may be transmitted with a SIFS period. The mechanism for this allocation may be complex, and may include overhead for the polling mechanisms involved.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for a bandwidth efficient medium access control (MAC) protocol, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 6 illustrates an alternative method for requeuing failed frames via firmware or a host interface, in accordance with an embodiment of the invention.

DETAILED DESCRIPTION OF THE INVENTION

Figure 1A:
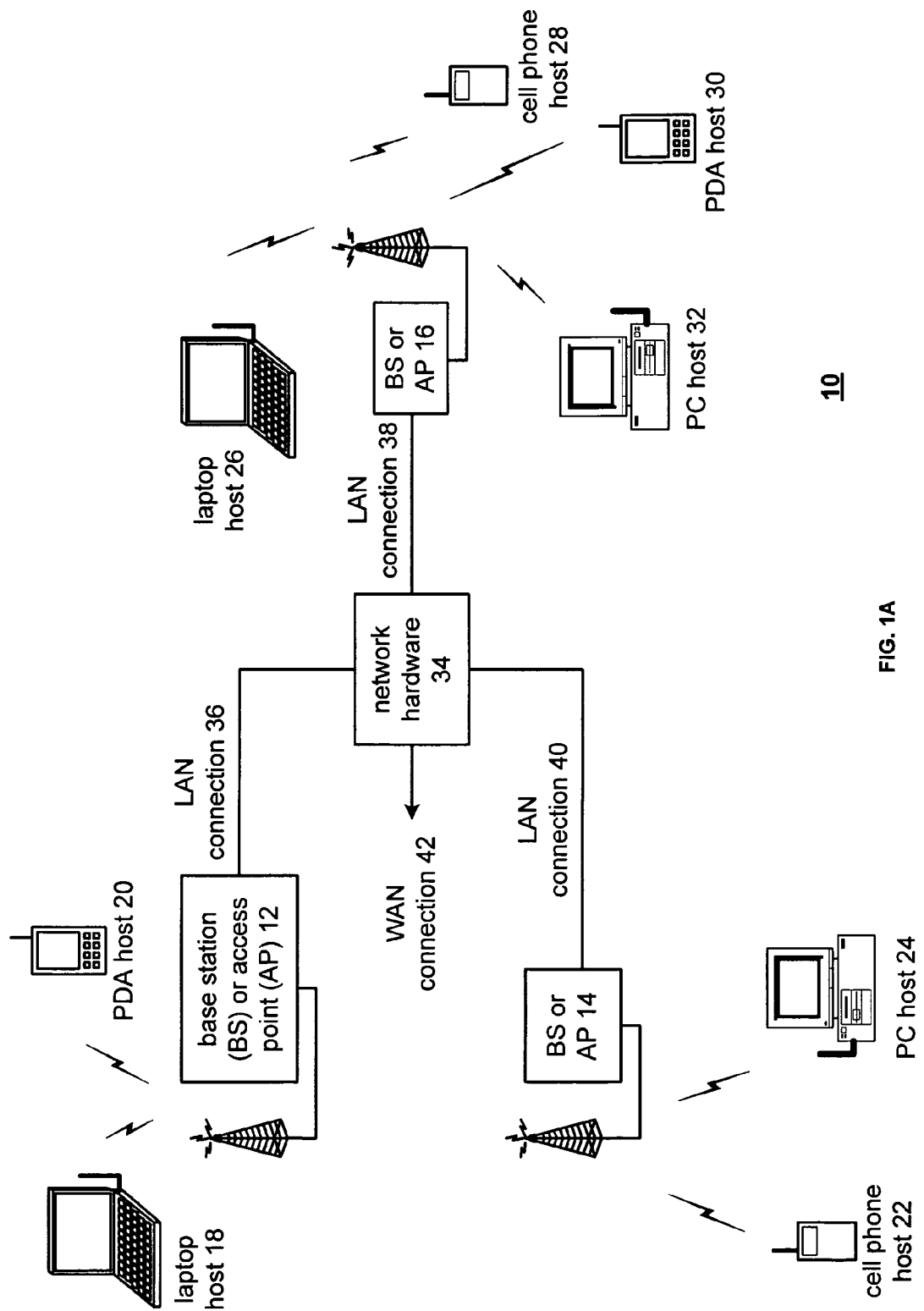
FIG. 1A illustrates a block diagram of a wireless communication system in accordance with an embodiment of the present invention.

Certain embodiments of the invention may be found in a method and system for a bandwidth efficient medium access control (MAC) protocol. Certain aspects of the invention provide a new medium access control protocol that may be adapted to simultaneously and efficiently handle both congestion control and channel errors. In this regard, the congestion control and channel errors may be simultaneously handled without sacrificing bandwidth efficiency. The new medium access protocol can be configured for backward compatibility with existing DCF and may co-exist with basic service set (BSS) and independent basic service set (IBSS). The new MAC protocol can provide an efficient usage mechanism for each station (STA), which utilizes the new MAC protocol. This usage mechanism may be applicable in circumstances where DCF co-exists in the same basic service set (BSS) and independent basic service set (IBSS) such that STAs using DCF are not prevented from transmitting their fair share of data. In an embodiment of the invention, the new MAC protocol has the capability to implement various G-protection mechanisms (as defined below).

The bandwidth efficient MAC protocol does not necessarily require a new backoff for each new MPDU, but rather provides "bursting" of a series of MPDUs with minimal spacing between them. The bandwidth efficient MAC protocol can operate without requiring a positive acknowledgement (PACK) for each MPDU, but instead relies on negative ACKs (NACKs) for those MPDUs that are lost due to packet errors. The bandwidth efficient MAC protocol can be adapted to expediently retransmit lost MPDUs through appropriate host/firmware handshakes. In one aspect of the invention, the bandwidth efficient MAC protocol can distinguish between collisions and packet errors by pre-pending a RTS/CTS handshake in front of every MPDU burst. Accordingly, the backoff window for packet errors is generally not increased.

Various programmable parameters may be utilized for the number of MPDUs bursted and the total duration of the burst. This may be utilized to achieve fairness in heterogeneous networks, for example. Signaling between host and firmware may be implemented per MPDU so as to facilitate co-existence with DCF. Additionally, signaling between transmitter (Tx) and receiver (Rx) may be implemented on a per MPDU basis in order to facilitate co-existence with DCF. The network allocation vector (NAV) durations of RTS/CTS may be adjusted to protect the whole burst. Direct sequence spread spectrum or complimentary code keying (DSSS/CCK) rates may be utilized for the RTS/CTS exchange in order to achieve G-protection.

An interframe spacing (IFS) may be utilized to control priority access to a wireless medium. An IFS is a mandatory time interval that occurs between the transmission of frames. The mandatory time intervals may comprise at least one of a point coordination function IFS (PIFS), a short IFS (SIFS) and a distributed coordination function IFS (DIFS plus backoff) and the interframe spacing time intervals disclosed herein.

FIG. 1A illustrates a block diagram of a wireless communication system in accordance with an embodiment of the present invention. Referring to FIG. 1A, there is shown a communication system 10 that comprises a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28.

The base stations or access points 12-16 may be operably coupled to the network hardware 34, for example, via local area network connections 36, 38 and 40. The network hardware 34, for example, a router, switch, bridge, modem, or system controller, may provide a wide area network connection 42 for the communication system 10. Each of the base stations or access points 12-16 may have an associated antenna or antenna array to communicate with the wireless communication devices in its area. Typically, the wireless communication devices may register with a particular base station or access point 12-16 to receive services from the communication system 10. For direct connections, for example, point-to-point communications, wireless communication devices may communicate directly via an allocated channel.

Typically, base stations are used for cellular telephone systems and similar type of systems, while access points are used for in-home or in-building wireless networks. Regardless of the particular type of communication system, each wireless communication device includes a built-in radio and/or is coupled to a radio.

Figure 1B:
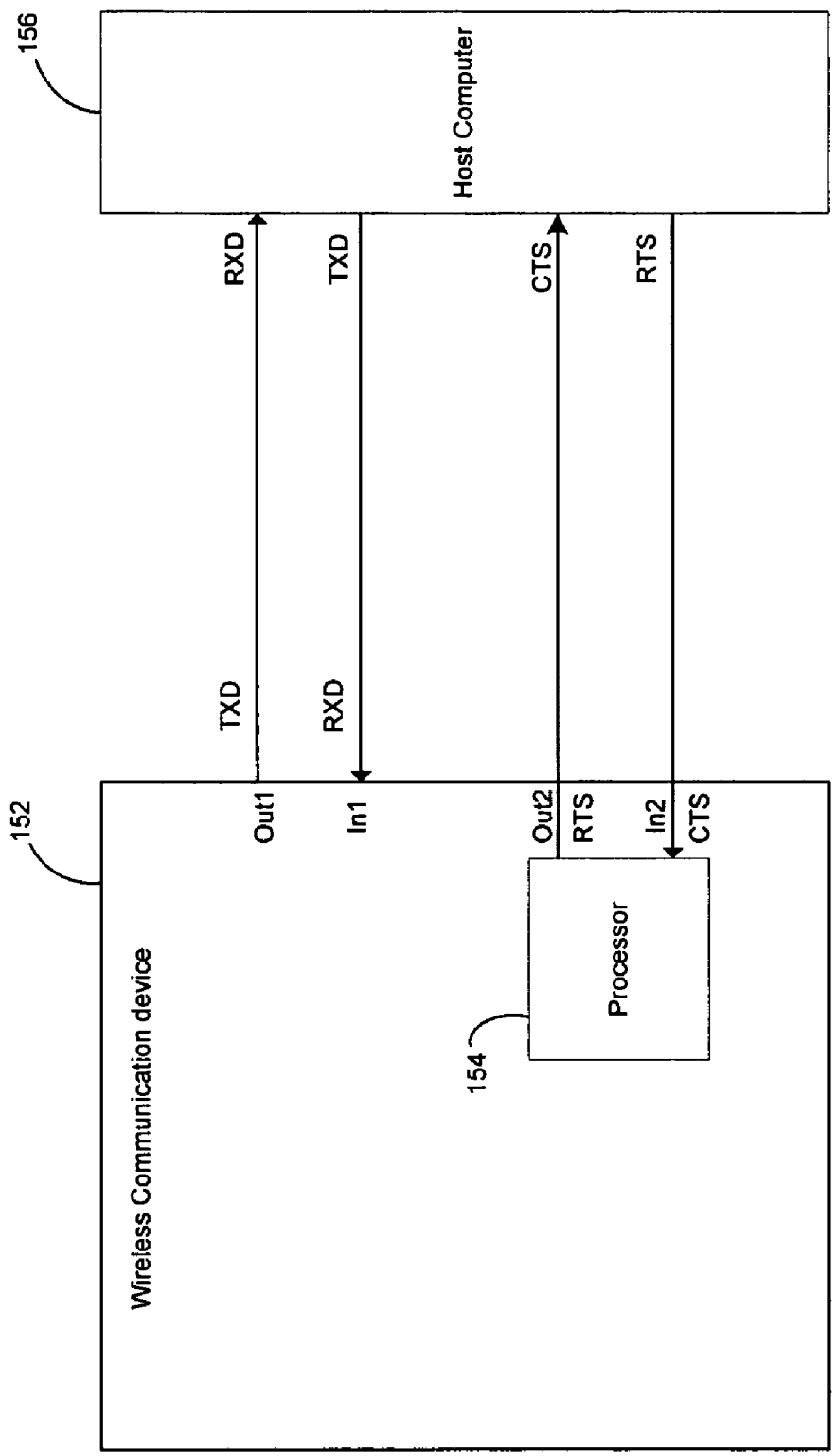
FIG. 1B is a block diagram of an exemplary interface between a wireless communication device and a host, which may be utilized in connection with an embodiment of the invention.

FIG. 1B is a block diagram of an exemplary interface between a wireless communication device and a host, which may be utilized in connection with an embodiment of the invention. Referring to FIG. 1B, there is shown a wireless communication device (WCD) 152 that comprises a processor 154 and a host computer 156.

The wireless communication device (WCD) 152 may comprise for example, a baseband processor chip that may be utilized in, for example, GSM/GPRS/EDGE compliant devices. The WCD 152 may be adapted to offer a high level of system integration, performance, and features for next generation wireless multimedia handsets and data modules. The processor 154 may be an ARM processor, for example, or other suitable type of processor. The processor 154 may be adapted to send out a control signal, request to send (RTS), to determine if a channel is available for transmission. The processor 154 may further be adapted to receive an acknowledgement signal, clear to send (CTS), when the channel is available for transmission. The host computer 156 may be adapted to provide services and information to a series of other devices. The WCD 152 may comprise at least one input port (IN1, IN2) to receive data RXD from the host computer 156 and at least one output port (OUT1, OUT2) to transmit data TXD to the host computer 156.

Figure 1C:
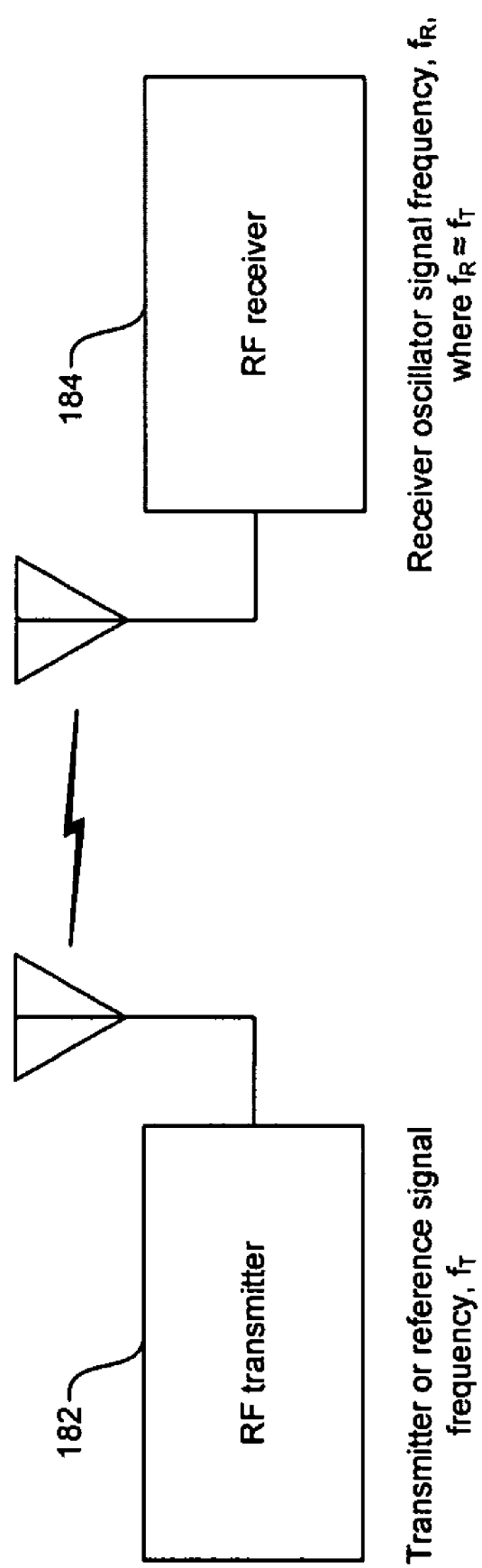
FIG. 1C illustrates a block diagram of a radio transmitter and a radio receiver, which may be utilized in connection with an embodiment of the present invention.

FIG. 1C illustrates a block diagram of a radio transmitter and a radio receiver, in which may be utilized in connection with an embodiment of the present invention. Referring to FIG. 1C, there is shown an RF transmitter 182 and an RF receiver 184. The RF transmitter 182 may be part of, for example, a first base station, access point, or wireless communication device in the communication system 10 in FIG. 1A. The RF transmitter 182 may comprise suitable logic, circuitry, and/or code that may be adapted to generate a modulated signal with a reference signal frequency $f_T$. The RF transmitter 182 may also be adapted to transmit the modulated signal to at least one additional base station, access point, and/or wireless communication device. The RF receiver 184 may be part of, for example, a second base station, access point, or wireless communication device in the communication system 10. The RF transmitter 182 may comprise suitable, logic, circuitry, and/or code that may be adapted receive a modulated signal and to generate a demodulated signal by demodulating the received modulated signal with reference signal frequency, $f_T$, with an oscillator signal with frequency, $f_R$. The closer the value of the oscillator signal frequency to the value of the reference signal frequency the better the demodulation of the received modulated signal.

Figure 1D:
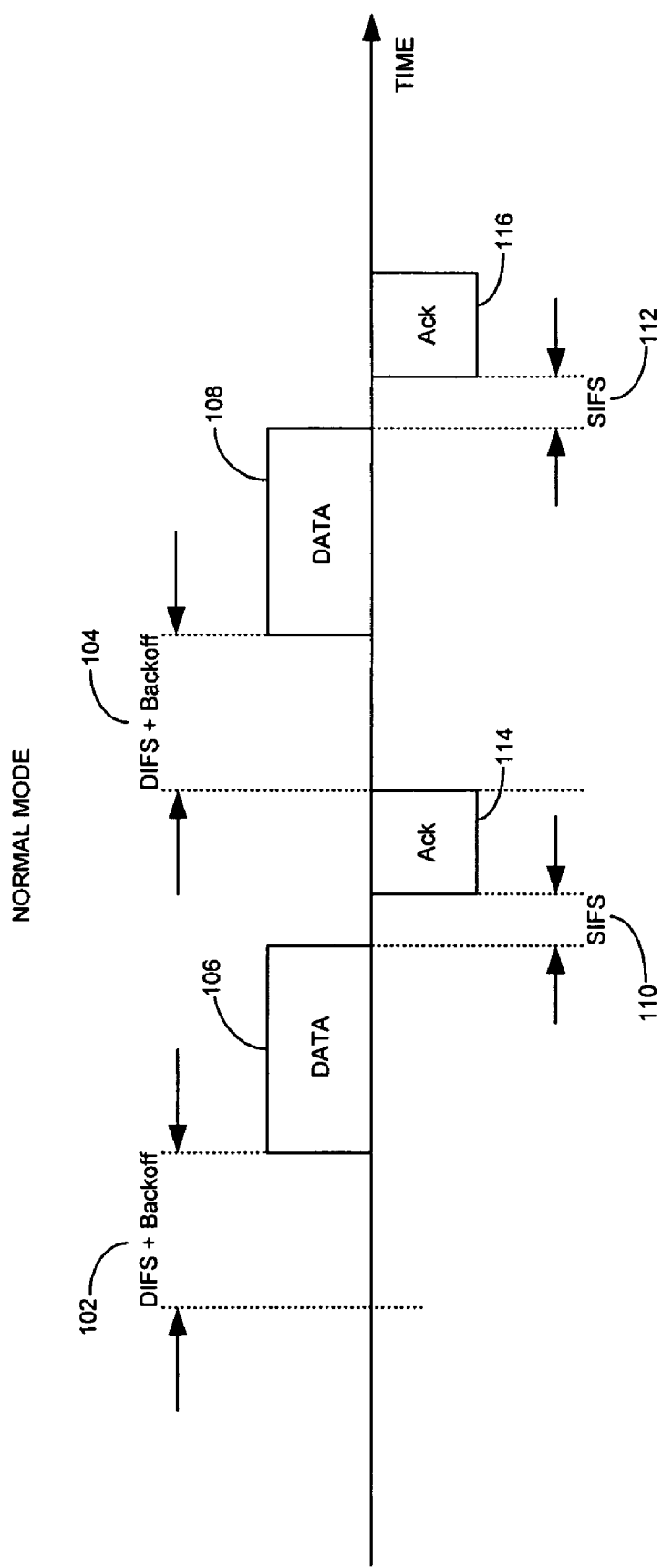
FIG. 1D is a diagram illustrating normal mode of operation for a medium access control (MAC) protocol, which may be utilized in connection with an embodiment of the invention.

FIG. 1D is a diagram illustrating normal mode of operation for a medium access control (MAC) protocol, which may be utilized in connection with an embodiment of the invention. Referring to FIG. 1D, there is shown a plurality of DIFS plus backoff intervals 102 and 104, a plurality of MPDUs 106 and 108, a plurality of SIFS intervals 110 and 112, and a plurality of acknowledgement (PACK) frames 114 and 116.

During a DCF normal mode of operation, when a station senses the channel is idle, the station waits for a DIFS plus backoff interval 102 or DIFS plus backoff interval 104 and samples the channel again. If the channel is still idle, the station transmits a MPDU 106 or MPDU 108. The receiving station may calculate the checksum and determine whether the packet was received correctly. Upon receipt of a correct packet, the receiving station waits for a SIFS interval 110 or SIFS interval 112 and transmit a positive acknowledgement frame PACK 114 or PACK 116 back to the source station, indicating the transmission was successful.

Figure 2:
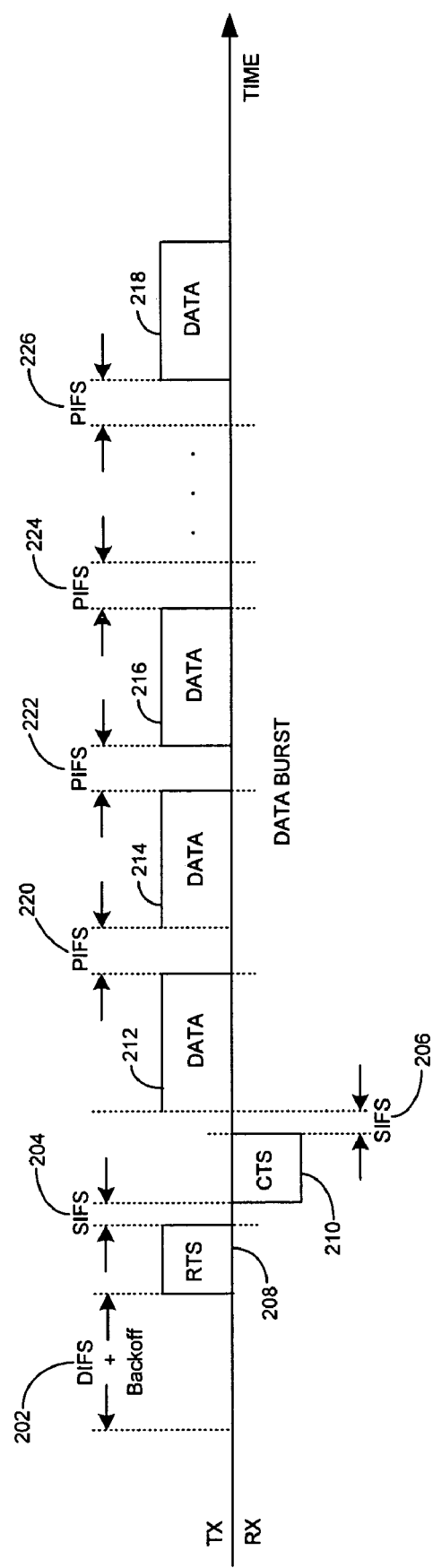
FIG. 2 is a diagram illustrating bursting in a bandwidth efficient medium access control (MAC) protocol, in accordance with an embodiment of the invention.

FIG. 2 is a diagram illustrating bursting in a bandwidth efficient medium access control (MAC) protocol, in accordance with an embodiment of the invention. Referring to FIG. 2, there is shown a DIFS plus backoff interval 202, a plurality of SIFS intervals, SIFS 204 and SIFS 206, an optional request to send (RTS) frame 208, an optional clear to send (CTS) frame 210, a plurality of MPDUs, namely MPDU 212, MPDU 214, MPDU 216 and MPDU 218 and a plurality of PIFS intervals, namely PIFS 220, PIFS 222, PIFS 224 and PIFS 226.

During the bandwidth efficient MAC protocol mode of operation, a DIFS plus backoff interval 202 may be followed by an RTS 206/CTS 210 exchange and then by a PIFS separated burst of MPDUs. When a source station senses the channel is idle, the source station waits for a DIFS plus backoff interval 202 and transmits a RTS frame 208. If the channel is available for transmission, the receiving station may wait for a SIFS interval 204 and transmit a CTS frame 210. After waiting for a SIFS interval 206, the source station may transmit a burst of MPDU fragments, for example, MPDU 212, MPDU 214, MPDU 216 and MPDU 218 separated by PIFS intervals, for example, PIFS 220, PIFS 222, PIFS 224 and PIFS 226. This reduces the interframe spacing durations and eliminates per MPDU backoffs and PACKs, thereby conserving bandwidth. A fairness parameter such as a size of the burst may be programmable in both the number of MPDUs and total duration. The PIFS is a minimal interval in which the medium remains contention free and a potential negative ACK (NACK) may be detected. The optional RTS/CTS mechanism may be utilized to resolve medium contention for the whole burst. The MPDUs in the burst, for example, the plurality of MPDUs, MPDU 212, MPDU 214, MPDU 216 and MPDU 218 may have multiple destinations and broadcast/multicast may also be allowed. The last MPDU in a burst may be acknowledged and may not be transmitted to a bandwidth efficient MAC protocol capable device.

Figure 3:
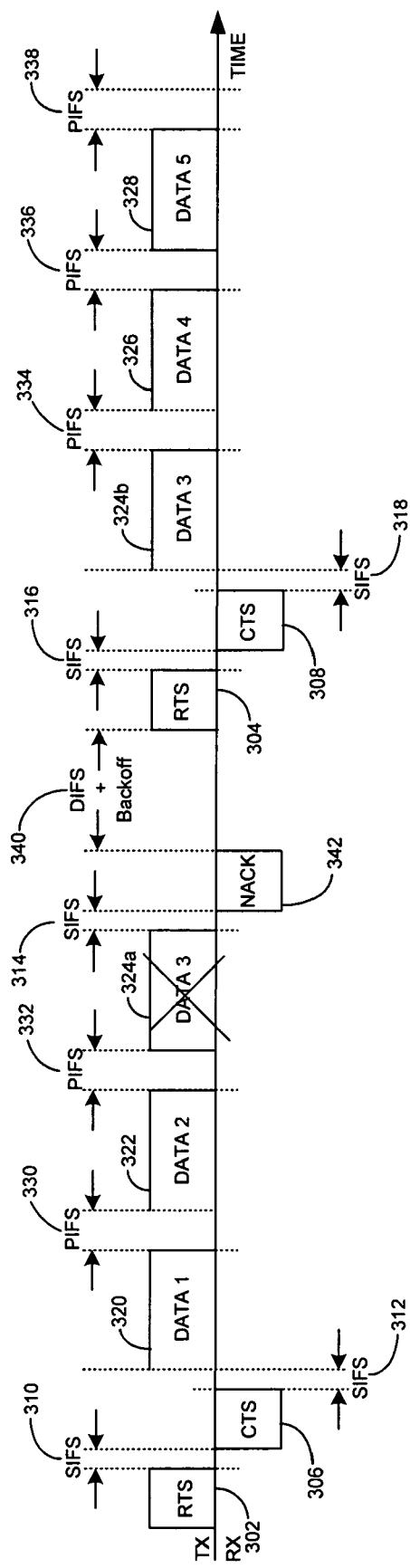
FIG. 3 is a diagram illustrating error recovery, in accordance with an embodiment of the invention.

FIG. 3 is a diagram illustrating error recovery, in accordance with an embodiment of the invention. Referring to FIG. 3, there is shown a plurality of RTS frames, RTS 302 and RTS 304, a plurality of CTS frames, CTS 306 and CTS 308, a plurality of SIFS intervals, SIFS 310, SIFS 312, SIFS 314, SIFS 316 and SIFS 318. There is also shown a plurality of MPDU data fragments, DATA 1 320, DATA 2 322, DATA 3 324b, DATA 4 326 and DATA 5 328, an MPDU fragment received in error, DATA 3 324a, a negative ACK (NACK) 342, a DIFS with backoff interval 340 and a plurality of PIFS intervals, PIFS 330, PIFS 332, PIFS 334, PIFS 336 and PIFS 338.

When a source station senses that the channel is idle, the station waits for a DIFS plus backoff interval and transmits a RTS frame 302. If the channel is available for transmission, the receiving station may wait for a SIFS interval 310 and transmit a CTS frame 306. After waiting for a SIFS interval 312, the source station may transmit a burst of MPDU fragments separated by PIFS intervals. This eliminates per MPDU backoffs and PACKs, thereby conserving bandwidth. If a frame is received in error, for example, if the received MPDU fragment DATA 3 324a is received in error, a bandwidth efficient MAC protocol capable receiving station may transmit a NACK 342 after an SIFS interval 314. The NACK 342, similar to a PACK, does not follow the network allocation vector (NAV). The detection of the NACK 342 by the source station may end the current burst. A new burst of MPDU fragments may be started after any IFS interval, for example, SIFS 312, PIFS 330, DIFS plus backoff interval 340 with the corrupted MPDU frame DATA 3 324b retransmitted first in the burst following a RTS/CTS exchange.

Figure 4:
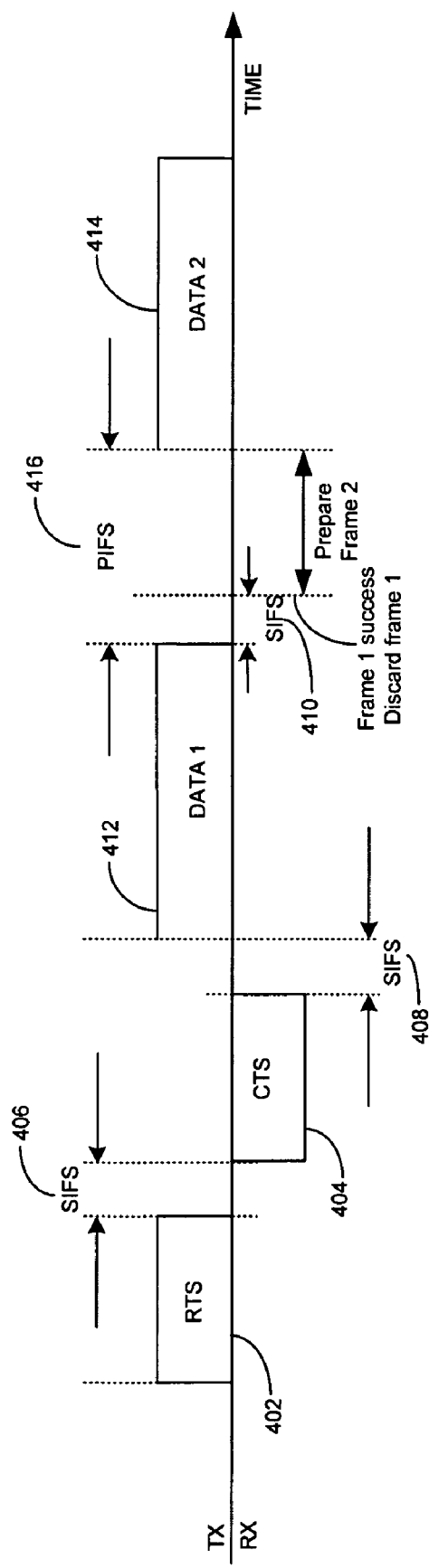
FIG. 4 is a diagram illustrating handling of failed frames when no NACK is received, in accordance with an embodiment of the invention.

FIG. 4 is a diagram illustrating handling of failed frames when no NACK is received, in accordance with an embodiment of the invention. Referring to FIG. 4, there is shown a RTS frame 402, a CTS frame 404, a plurality of SIFS intervals, SIFS 406, SIFS 408 and SIFS 410, a PIFS interval 416 and a plurality of MPDU fragments DATA 1 412 and DATA 2 414.

When a station senses that the channel is idle, the source station waits for a DIFS plus backoff interval and transmits a RTS frame 402. If the channel is available for transmission, the receiving station may wait for a SIFS interval 406 and transmit a CTS frame 404. After waiting for a SIFS interval 408, the source station may transmit a burst of MPDU fragments separated by PIFS intervals. Depending on hardware and/or host capabilities, a transmitter may take one of various approaches to re-queue failed frames. In one exemplary approach, a most recently transmitted frame, for example, DATA 1 412 may be kept as pending until just past a SIFS interval 410. If no NACK is received, then the transmitter may claim this frame to be successful and advance to the next frame in the queue. If the NACK is received, then the transmitter still has the failed frame immediately available for re-transmission. Various timing constraints may have to be met for preparation of the next frame in a PIFS-SIFS timing scenario.

Figure 5:
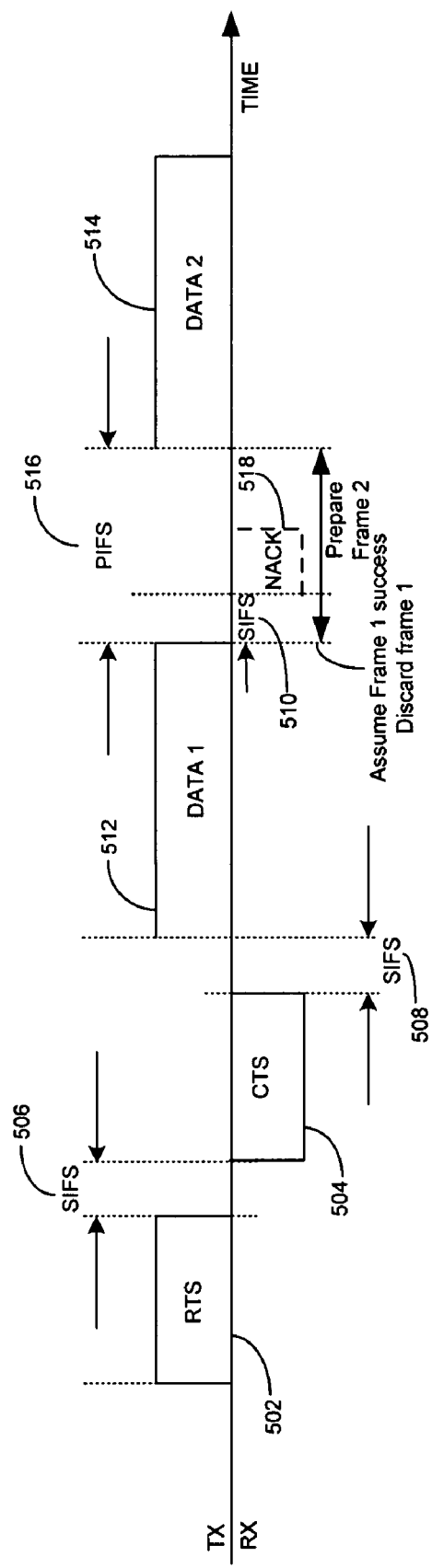
FIG. 5 is a diagram illustrating an alternative method for handling of failed frames when no NACK is received, in accordance with an embodiment of the invention.

FIG. 5 is a diagram illustrating an alternative method for handling of failed frames when no NACK is received, in accordance with an embodiment of the invention. Referring to FIG. 5, there is shown a RTS frame 502, a CTS frame 504, a plurality of SIFS intervals, SIFS 506, SIFS 508 and SIFS 510, a PIFS interval 516, a conditional NACK 518 and a plurality of MPDU fragments DATA 1 512 and DATA 2 514.

When a station senses that the channel is idle, the station waits for a DIFS plus backoff interval and transmits a RTS frame 502. If the channel is available for transmission, the receiving station may wait for a SIFS interval 506 and transmit a CTS frame 504. After waiting for a SIFS interval 508, the source station may transmit a burst of MPDU fragments separated by PIFS intervals. In another exemplary approach for re-queuing failed frames, it may be assumed that a transmitted frame, for example, DATA 1 512 is successful and a next queued frame, for example, DATA 2 514 maybe prepared. This may be true in most circumstances, particularly in instances where there are low packet error rates. Notwithstanding, this alternative methodology may provide more time for preparation of the next frame in the queue. If a NACK 518 is received after a SIFS interval 510, the transmitter may place the failed frame, for example, DATA 1 512 back in the head of the queue. This may be achieved either by hardware alone, and/or by firmware and/or host interaction. In an exemplary embodiment of the invention, a hardware-based approach may comprise programming a direct memory access (DMA) controller to re-queue the failed frame.

In an instance where immediate advancement to the next frame occurs, a host/firmware interface may be utilized for re-queuing failed frames. In this regard, firmware may be adapted to maintain a unique frame identifier (FrameID) of the last frame transmitted. Upon receiving a NACK, the firmware may notify the host, indicating the FrameID of the failed frame. The host or driver may rearrange the host frame queue, and insert the failed frame at the head of the queue. The insertion of the failed frame in the queue may be achieved via a pointer reallocation, for example. The hardware queue may be left untouched, and this may speed up the process. The firmware may discard frames from the hardware queue until it finds a frame whose FrameID matches the failed one. This operation may be readily achieved via the host, for example, the host computer 156 (FIG. 1B) without requiring additional processing power. For example, a pointer for a software queue may be adjusted.

In one aspect of the invention, firmware may be adapted to asynchronously discard those frames that may already be queued in hardware. The firmware may process and transmit frames from other hardware queues in parallel. A unique FrameID may be utilized to specify the hardware queue of the failed frame. In this regard, other hardware queues may continue to operate normally. The requeuing process may occur in parallel with the backoff for the new burst of MPDU fragments, so that the total delay is minimized.

FIG. 6 illustrates an alternative method for requeuing failed frames via firmware or a host interface, in accordance with an embodiment of the invention. Referring to FIG. 6, there is shown a software (SW) first-in-first-out (FIFO) stack 602, a software pointer 650 and a hardware (HW) FIFO stack 604. FIG. 6 comprises a plurality of figures, FIG. 6a, FIG. 6b, FIG. 6c and FIG. 6d illustrating steps for an alternative method for requeuing failed frames via firmware or a host interface.

Referring to FIG. 6a, the firmware has successfully transmitted frame #1 and is currently transmitting frame #2 in the HW FIFO 604. The host is posting frame #3 in the hardware queue. The software pointer 650 points to the last frame queued in the HW FIFO 604. The SW pointer 650 points to frame #3 in the SW FIFO 602.

Referring to FIG. 6b, following the events illustrated in FIG. 6a, the firmware may receive a NACK for frame #2 while the host is posting frame #4 in the HW FIFO 604. The SW pointer 650 points to frame #4 in the SW FIFO 602.

Referring to FIG. 6c, following the events illustrated in FIG. 6b, the host may be notified by the firmware and the host may move its SW pointer 650 indicating the last frame in hardware from frame #4 to frame #1. The firmware may discard frame #3 in the HW FIFO 604.

Referring to FIG. 6d, following the events illustrated in FIG. 6c, the firmware discards frame #4 in the HW FIFO 604 and starts a new burst of MPDU fragments by retransmitting frame #2 requeued by the SW FIFO 602 by the firmware. The SW pointer 650 points to frame #2.

In accordance with an embodiment of the invention, bandwidth efficient MAC protocol may coexist with DCF and enhanced DCF (EDCF) in the same BSS and IBSS. A host may be adapted to categorize devices as being bandwidth efficient MAC protocol capable or not bandwidth efficient MAC protocol capable. This categorizing may be done by the host when the device joins the BSS or IBSS. If the receive address in a MPDU belongs to a bandwidth efficient MAC protocol capable device, the host may indicate this MPDU as "burstable." The host may indicate the acknowledgment policy for the MPDU as "use NACK." The firmware may be adapted to utilize bursting for consecutive "burtstable" MPDUs and use DCF or EDCF for all other MPDUs. In one aspect of the invention, a non-burstable MPDU may be attached at the end of a bandwidth efficient MAC protocol burst. The burst length may be affected by the queuing sequence of the MPDUs at the host. The host may optimize bursting by avoiding interleaving of burstable and non-burstable MPDUs.

A bandwidth efficient MAC protocol capable receiving station may need to know whether the acknowledgement policy is "use PACK" or "use NACK" before receiving the MPDUs. A source station may also need to indicate an acknowledgement (ACK) policy for each transmitted MPDU. The "order" bit in a frame control portion of a MAC header may be redefined to indicate the acknowledgement (ACK) policy. For example, logic "1" order bit may indicate, "use NACK", and logic "0" order bit may indicate, "use PACK." Alternatively, the bandwidth efficient MAC protocol may use frames of type QoS-DATA and redefine the ACK policy options in the QoS control field.

Figure 7:
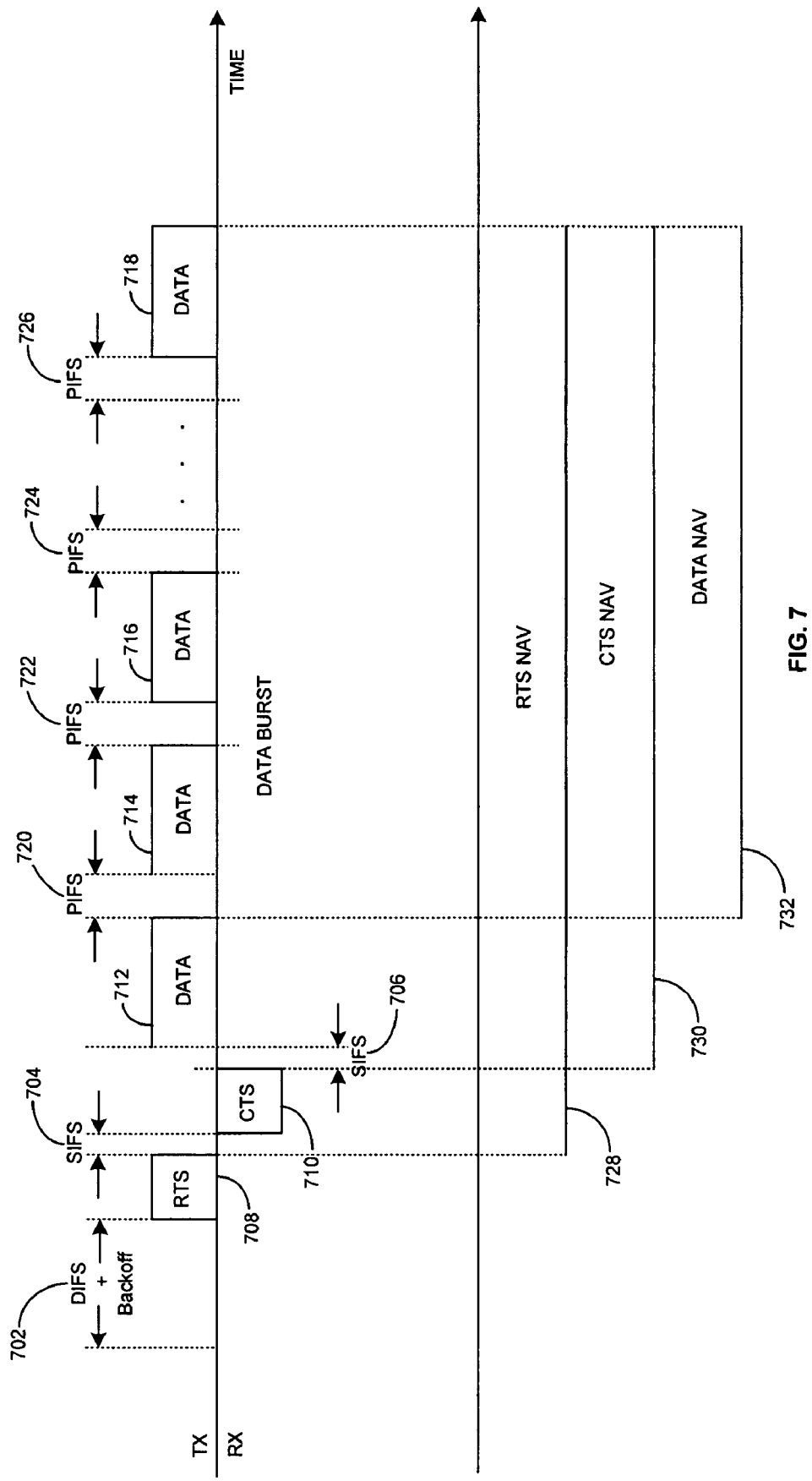
FIG. 7 is a diagram illustrating exemplary NAV settings for data bursts, in accordance with an embodiment of the invention.

FIG. 7 is a diagram illustrating exemplary NAV settings for data bursts, in accordance with an embodiment of the invention. Referring to FIG. 7, there is shown a DIFS plus backoff interval 702, a plurality of SIFS intervals, SIFS 704 and SIFS 706, a request to send (RTS) frame 708, a clear to send (CTS) frame 710, a plurality of MPDUs, MPDU 712, MPDU 714, MPDU 716 and MPDU 718, a plurality of PIFS intervals, PIFS 720, PIFS 722, PIFS 724 and PIFS 726 and a plurality of network allocation vectors (NAV), RTS NAV 728, CTS NAV 730 and DATA NAV 732.

During the bandwidth efficient MAC protocol mode of operation, a DIFS plus backoff interval 702 may be followed by an RTS 706/CTS 710 exchange and then by a PIFS separated burst of MPDUs. When a station senses the channel is idle, the station waits for a DIFS plus backoff interval 702 and transmits a RTS frame 708. If the channel is available for transmission, the receiving station may wait for a SIFS interval 704 and transmit a CTS frame 710. After waiting for a SIFS interval 706, the source station may transmit a burst of MPDU fragments separated by PIFS intervals.

A NAV as indicated in an RTS 708/CTS 710 exchange may cover or protect a burst of MPDUs. A bandwidth efficient MAC protocol capable device may have the capability to cancel their NAV if a burst is stopped prematurely because of a frame error. A host/firmware interface may be defined for the proper calculation of NAV. The host/firmware interface may comprise a queue maintained in hardware and a protocol describing host and firmware operations for calculating the NAV. Rules may be described that enable bandwidth efficient MAC protocol capable devices to cancel their NAV in case of a frame error.

In accordance with an embodiment of the invention, a queue with NAV durations and control information may be maintained in hardware or software. A host may be adapted to write into the queue and firmware may be adapted to read from the queue. The size of the queue may be at least equal to the user selectable burst size limit or the maximum number of frames in the burst. Each queue entry may comprise a frame duration and a PIFS for each frame the host queues in hardware and at least one bit indicating whether the MPDU is burstable. For each new frame that is queued, the host may write into the NAV queue the frame duration and one PIFS interval. The host may also indicate with, for example, a single bit specifying whether the MPDU is burstable or not. In a RTS duration field of each burstable MPDU, the host may write the duration of the CTS and two SIFS intervals. The duration of the RTS NAV 728 is from the instant the RTS 708 has been transmitted to the instant the last burstable-MPDU 718 has been transmitted. The duration of the CTS NAV 730 starts from an instant the CTS 710 has been transmitted and end at an instant the last burstable-MPDU 718 has been transmitted. The duration of the DATA NAV 732 is from the instant the first burstable MPDU 712 has been transmitted to the instant the last burstable-MPDU 718 has been transmitted.

For each new bandwidth efficient MAC protocol burst, the firmware may accumulate the NAV queue entries of the burstable MPDUs that will be used in the burst, and subtract one PIFS interval. The initial calculation or accumulation of queue entries of the burst may stop when either the burst limit has been reached, or the queue is emptied, or the first non-burstable MPDU is encountered. For the duration field of a frame inside a burst, if the frame is not the last frame in the burst, the sum of NAV queue entries for the remaining frames in the burst excluding the current frame may be utilized. If the frame is the last frame in a burst and has an ACK policy "use PACK", one SIFS interval and one ACK interval may be added. If the frame is the last frame in the burst with an ACK policy "use NACK", then no interval may be added.

Figure 8:
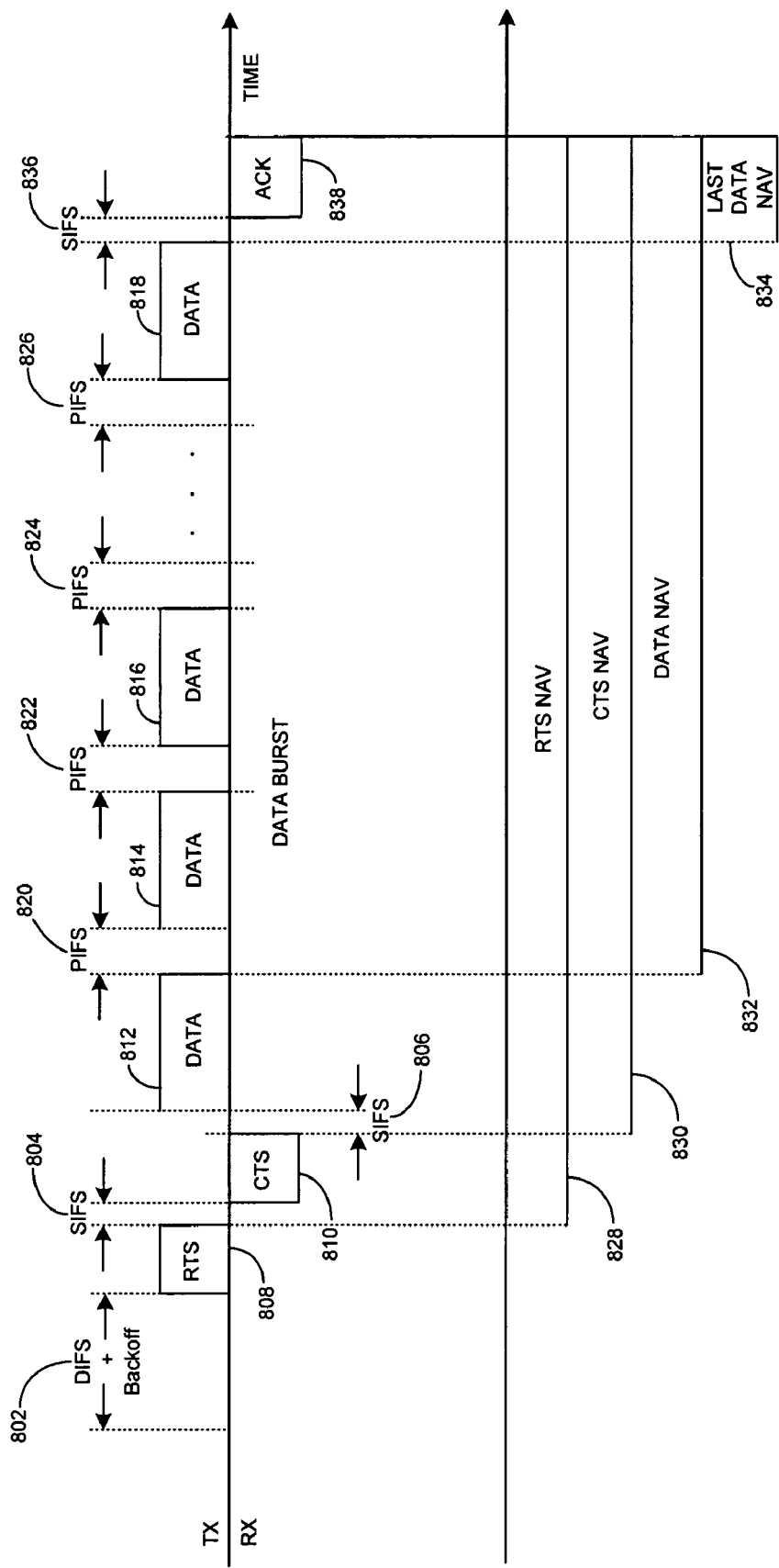
FIG. 8 is a diagram illustrating exemplary NAV settings for data bursts with a non-burstable MPDU attached at the end of the burst, in accordance with an embodiment of the invention.

FIG. 8 is a diagram illustrating exemplary NAV settings for data bursts with a non-burstable MPDU attached at the end of the burst, in accordance with an embodiment of the invention. Referring to FIG. 8, there is shown a DIFS plus backoff interval 802, a plurality of SIFS intervals, SIFS 804, SIFS 806 and SIFS 836, an PACK frame 838, a request to send (RTS) frame 808, a clear to send (CTS) frame 810, a plurality of MPDUs, namely MPDU 812, MPDU 814, MPDU 816 and MPDU 818, a plurality of PIFS intervals, namely PIFS 820, PIFS 822, PIFS 824 and PIFS 826 and a plurality of network allocation vectors (NAV), RTS NAV 828, CTS NAV 830, DATA NAV 832 and a last DATA NAV 834.

For each new bandwidth efficient MAC protocol burst, the firmware may accumulate the NAV queue entries of the burstable MPDUs that will be used in the burst, and subtract one PIFS interval. The burst may stop when either the burst limit has been reached, or the queue is emptied, or the first non-burstable MPDU is encountered. The first non-burstable MPDU, for example, MPDU 818 may be attached at the end of the burst, in which case the duration of the NAV may be increased by one SIFS interval 836 and one PACK interval 838. Firmware may be utilized to add the result to the NAV duration field of the RTS supplied by the host.

To improve network efficiency, a bandwidth efficient MAC protocol capable device may cancel its NAV setting when a burst ends prematurely. A bandwidth efficient MAC protocol capable device that has set its NAV setting due to an RTS, for example, RTS NAV 828 may indicate the start of an bandwidth efficient MAC protocol burst through the "order" bit in the frame control (FC) of the MAC header. The device may cancel its NAV if a physical layer (PHY) clear channel assessment (CCA) indicator indicates that the medium is idle for a DIFS plus backoff interval, or if it receives a NACK. The CCA indicator may be TRUE when the channel is free and transmission is allowed. A bandwidth efficient MAC protocol capable device that has set its NAV due to a CTS, for example, CTS NAV 830, may indicate the start of a bandwidth efficient MAC protocol burst through the "order" bit in the FC of the MAC header. The bandwidth efficient MAC protocol capable device may cancel its NAV if it receives a NACK.

In accordance with an embodiment of the invention, the protection of orthogonal frequency division multiplexing (OFDM) frames in the presence of B-only devices incapable of detecting OFDM frames, known as G-protection may be achieved in bandwidth efficient MAC protocol capable devices by using complementary code keying (CCK) rates for the RTS/CTS exchange. High CCK rates, for example, 11 Mbps, may be utilized for the RTS/CTS exchange when bandwidth efficient MAC protocol capable device is operating in a G-protection mode.

Figure 9:
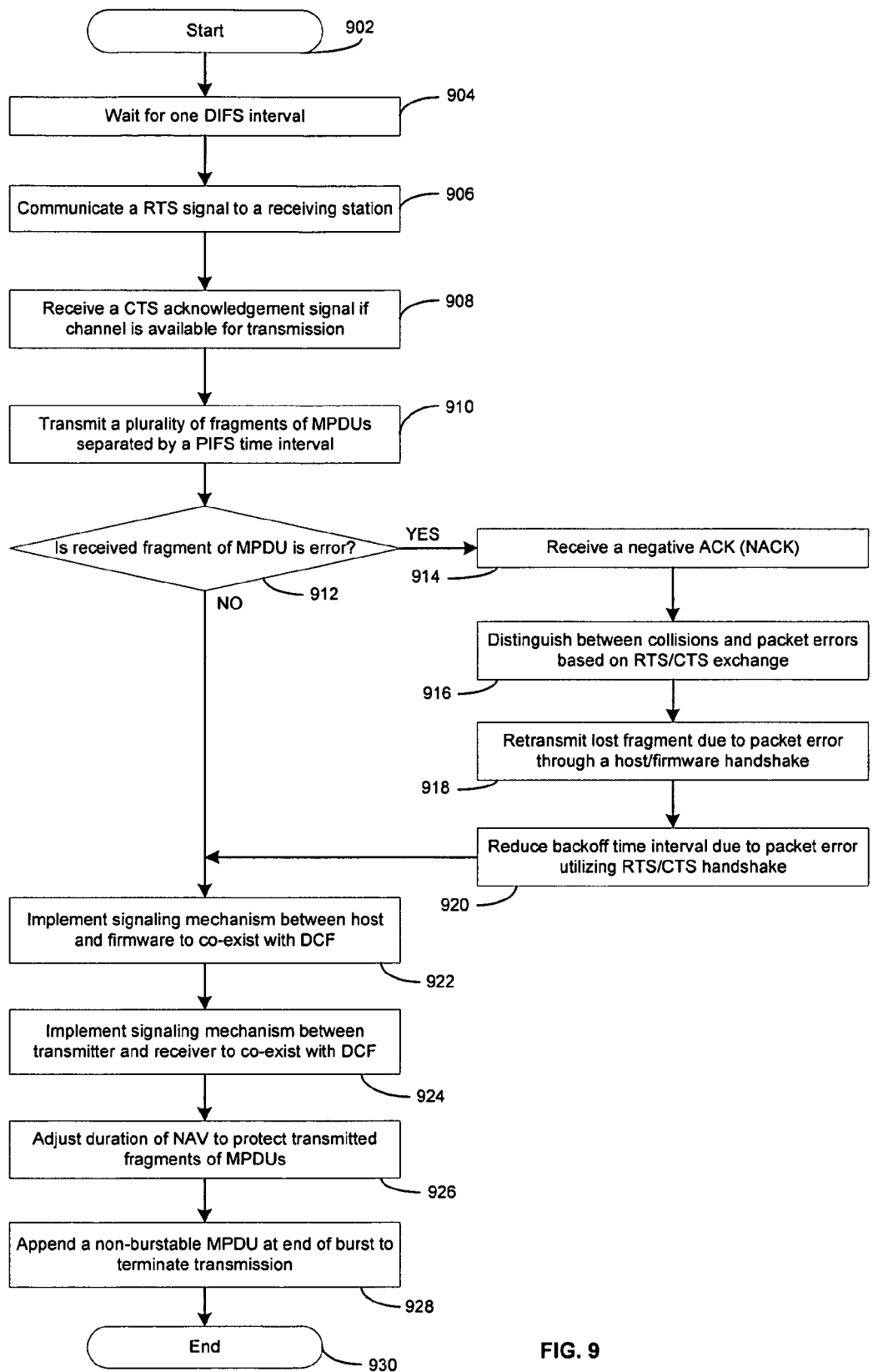
FIG. 9 is a flowchart illustrating the operation of a bandwidth efficient medium access control (MAC) protocol, in accordance with an embodiment of the invention.

FIG. 9 is a flowchart illustrating the operation of a bandwidth efficient medium access control (MAC) protocol, in accordance with an embodiment of the invention. Referring to FIG. 9, the exemplary steps may begin at start step 902. In step 904, a wireless communication device may wait for one DIFS plus backoff interval. In step 906, a request to transmit (RTS) signal may be communicated to a receiving station to determine whether a channel is available for transmission. In step 908, a clear to send (CTS) acknowledgement signal may be received from the receiving station if the channel is available for transmission. In step 910, a plurality of fragments of medium access control (MAC) protocol data units (MPDUs) separated by a point coordination function (PCF) interframe space (PIFS) interval may be transmitted in response to the received CTS acknowledgement signal. In step 912, it may be determined whether any of the received fragments of MPDUs are in error. Control may pass to step 914 if any of the received fragments of MPDUs are in error.

In step 914, a negative acknowledgement (NACK) signal may be received if at least one of the transmitted plurality of fragments of MPDUs is lost due to a packet error. In step 916, collisions and packet errors may be distinguished based on the communicated RTS signal and the received CTS acknowledgement signal. In step 918, at least one of the transmitted plurality of fragments of MPDUs lost due to packet error may be retransmitted through a host and firmware handshake. In step 920, a backoff time interval for the packet errors may be reduced based on the communicated RTS signal and the received CTS acknowledgement signal. Control then passes to step 922. In step 910, if any of the received fragments of MPDUs are not in error, control passes to step 922.

In step 922, a signaling mechanism may be implemented between a host and firmware for each of the transmitted plurality of fragments of MPDUs to co-exist with a distributed coordination function (DCF) mechanism of transporting packets of data. In step 924, the signaling mechanism may be implemented between a transmitter and a receiver for each of the transmitted plurality of fragments of MPDUs to co-exist with a distributed coordination function (DCF) mechanism of transporting said packets of data. In step 926, a duration of a network allocation vector (NAV) of at least one of: a RTS NAV, a CTS NAV and a data NAV may be adjusted to protect the transmitted plurality of fragments of MPDUs. In step 928, a non-burstable MPDU may be appended at end of the transmitted plurality of fragments of MPDUs to terminate transmission of the transmitted plurality of fragments of MPDUs. Control then passes to end step 930.

In accordance with another embodiment of the invention, a system for a bandwidth efficient medium access control (MAC) protocol may comprise a wireless communication device, for example, WCD 152 (FIG. 1B) that communicates a request to transmit (RTS) signal to a receiving station, for example, a host computer 156 to determine whether a channel is available for transmission. The wireless communication device, for example, WCD 152 may be adapted to receive a clear to send (CTS) acknowledgement signal from the receiving station, for example, the host computer 156 if the channel is available for transmission. During the bandwidth efficient MAC protocol mode of operation, a DIFS plus backoff interval 202 (FIG. 2) may be followed by an RTS 206/CTS 210 exchange and then by a PIFS separated burst of MPDUs. When a station senses the channel is idle, the station waits for a DIFS plus backoff interval 202 and transmits a RTS frame 208. If the channel is available for transmission, the receiving station may wait for a SIFS interval 204 and transmit a CTS frame 210. After waiting for a SIFS interval 206, the source station may transmit a burst of MPDU fragments, MPDU 212, MPDU 214, MPDU 216 and MPDU 218 separated by PIFS intervals, PIFS 220, PIFS 222, PIFS 224 and PIFS 226.

The wireless communication device, for example, WCD 152 may comprise suitable logic, circuitry and/or code that may be adapted to receive a negative acknowledgement (NACK) signal if at least one of the transmitted plurality of MPDU fragments is lost. If a frame is received in error, for example, if the received MPDU fragment DATA 3 324a (FIG. 3) is in error, a bandwidth efficient MAC protocol capable receiver may transmit a NACK 342 within an SIFS interval 314. The wireless communication device, for example, WCD 152 may be adapted to retransmit at least one of the transmitted plurality of MPDU fragments that is lost through a host and firmware handshake or through a hardware assisted requeuing mechanism. A new burst of MPDU fragments may be started after any IFS interval, for example, SIFS 312, PIFS 330, DIFS plus backoff interval 340 with the corrupted MPDU frame DATA 3 324b retransmitted first in the burst following a RTS/CTS exchange. The wireless communication device, for example, WCD 152 may comprise suitable logic, circuitry and/or code that may be adapted to distinguish between collisions and packet errors based on the communicated RTS signal and the received CTS acknowledgement signal. The wireless communication device, for example, WCD 152 may be adapted to reduce a backoff time interval for the packet errors based on the communicated RTS signal and the received CTS acknowledgement signal. The wireless communication device for example, WCD 152 may be adapted to wait for at least one distributed coordination function (DCF) interframe space (DIFS plus backoff) interval before communicating the RTS signal to the receiving station.

The wireless communication device, for example, WCD 152 may comprise suitable logic, circuitry and/or code that may be adapted to execute a signaling mechanism between a host and firmware for each of the transmitted plurality of MPDU fragments to co-exist with a distributed coordination function (DCF) mechanism for transporting packets of data. The wireless communication device, for example, WCD 152 may be adapted to execute the signaling mechanism between a transmitter, for example, RF transmitter 182 (FIG. 1C) and a receiver, for example, RF receiver 184 for each of the transmitted plurality of MPDU fragments to co-exist with a distributed coordination function (DCF) mechanism of transporting the packets of data.

The wireless communication device, for example, WCD 152 may comprise suitable logic, circuitry and/or code that may be adapted to adjust a duration of a network allocation vector (NAV) of at least one of: a RTS NAV, a CTS NAV and a data NAV to protect the transmitted plurality of MPDU fragments. The wireless communication device may be adapted to append a non-burstable MPDU at end of the transmitted plurality of MPDU fragments to terminate transmission of the transmitted plurality of fragments of MPDUs. The first non-burstable MPDU, for example, MPDU 818 (FIG. 8) may be attached at the end of the burst, in which case the duration of the NAV may be increased by one SIFS interval 836 and one PACK interval 838.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling data, the method comprising:
communicating a request to transmit (RTS) signal to a receiving station to determine if a channel is available for transmission;
receiving a clear to send (CTS) acknowledgement signal from said receiving station if said channel is available for said transmission; and
transmitting a plurality of medium access control (MAC) protocol data unit (MPDU) fragments separated by a point coordination function (PCF) interframe space (PIFS) interval in response to said received CTS acknowledgement signal.

2. The method according to claim 1, comprising receiving a negative acknowledgement (NACK) signal if at least one of said transmitted plurality of said MPDU fragments is lost.

3. The method according to claim 2, comprising retransmitting at least one of said transmitted plurality of said MPDU fragments that is lost through at least one of: host and firmware handshake and hardware assisted requeuing mechanism.

4. The method according to claim 1, comprising distinguishing between collisions and packet errors based on said communicated RTS signal and said received CTS acknowledgement signal.

5. The method according to claim 4, comprising reducing a backoff time interval for said packet errors based on said communicated RTS signal and said received CTS acknowledgement signal.

6. The method according to claim 1, comprising executing a signaling mechanism between a host and firmware for each of said transmitted plurality of said MPDU fragments to co-exist with a distributed coordination function (DCF) mechanism for transporting packets of data.

7. The method according to claim 6, comprising executing said signaling mechanism between a transmitter and a receiver for each of said transmitted plurality of said MPDU fragments to co-exist with a distributed coordination function (DCF) mechanism for transporting said packets of data.

8. The method according to claim 1, comprising adjusting a duration of a network allocation vector (NAV) of at least one of: a RTS NAV, a CTS NAV and a data NAV to protect said transmitted plurality of said MPDU fragments.

9. The method according to claim 1, comprising appending a non-burstable MPDU to an end of said transmitted plurality of said MPDU fragments to terminate transmission of said transmitted plurality of said MPDU fragments.

10. A non-transitory computer readable medium having stored thereon, a computer program having at least one code section for handling data, the at least one code section being executable by a computer system for causing the computer system to perform steps comprising: communicating a request to transmit (RTS) signal to a receiving station to determine if a channel is available for transmission; receiving a clear to send (CTS) acknowledgement signal from said receiving station if said channel is available for said transmission; and transmitting a plurality of medium access control (MAC) protocol data unit (MPDU) fragments separated by a point coordination function (PCF) interframe space (PIFS) interval in response to said received CTS acknowledgement signal.

11. The non-transitory computer readable medium according to claim 10, wherein said at least one code section comprises code for receiving a negative acknowledgement (NACK) signal if at least one of said transmitted plurality of said MPDU fragments is lost.

12. The non-transitory computer readable medium according to claim 11, f wherein said at least one code section comprises code for retransmitting at least one of said transmitted plurality of said MPDU fragments that is lost through at least one of: host and firmware handshake and hardware assisted requeuing mechanism.

13. The non-transitory computer readable medium according to claim 10, wherein said at least one code section comprises code for distinguishing between collisions and packet errors based on said communicated RTS signal and said received CTS acknowledgement signal.

14. The non-transitory computer readable medium according to claim 13, wherein said at least one code section comprises code for reducing a backoff time interval for said packet errors based on said communicated RTS signal and said received CTS acknowledgement signal.

15. The non-transitory computer readable medium according to claim 10, wherein said at least one code section comprises code for executing a signaling mechanism between a host and firmware for each of said transmitted plurality of said MPDU fragments to co-exist with a distributed coordination function (DCF) mechanism for transporting packets of data.

16. The non-transitory computer readable medium according to claim 15, wherein said at least one code section comprises code for executing said signaling mechanism between a transmitter and a receiver for each of said transmitted plurality of said MPDU fragments to co-exist with a distributed coordination function (DCF) mechanism for transporting said packets of data.

17. The non-transitory computer readable medium according to claim 10, wherein said at least one code section comprises code for adjusting a duration of a network allocation vector (NAV) of at least one of: a RTS NAV, a CTS NAV and a data NAV to protect said transmitted plurality of said MPDU fragments.

18. The non-transitory computer readable medium according to claim 10, wherein said at least one code section comprises code for appending a non-burstable MPDU to an end of said transmitted plurality of said MPDU fragments to terminate transmission of said transmitted plurality of said MPDU fragments.

19. A system for handling data, the system comprising:
one or more circuits for use in a wireless communication device, wherein said one or more circuits is operable to communicates a request to transmit (RTS) signal to a receiving station to determine if a channel is available for transmission;
said one or more circuits is operable to receives a clear to send (CTS) acknowledgement signal from said receiving station if said channel is available for said transmission; and
said one or more circuits is operable to transmits a plurality of medium access control (MAC) protocol data unit (MPDU) fragments separated by a point coordination function (PCF) interframe space (PIFS) interval in response to said received CTS acknowledgement signal.

20. The system according to claim 19, wherein said one or more circuits is operable to receives a negative acknowledgement (NACK) signal if at least one of said transmitted plurality of said MPDU fragments is lost.

21. The system according to claim 20, wherein said one or more circuits is operable to retransmits at least one of said transmitted plurality of said MPDU fragments that is lost through at least one of: host and firmware handshake and hardware assisted requeuing mechanism.

22. The system according to claim 19, wherein said one or more circuits is operable to distinguishes between collisions and packet errors based on said communicated RTS signal and said received CTS acknowledgement signal.

23. The system according to claim 22, wherein said one or more circuits is operable to reduces a backoff time interval for said packet errors based on said communicated RTS signal and said received CTS acknowledgement signal.

24. The system according to claim 19, wherein said one or more circuits is operable to executes a signaling mechanism between a host and firmware for each of said transmitted plurality of said MPDU fragments to co-exist with a distributed coordination function (DCF) mechanism for transporting packets of data.

25. The system according to claim 24, wherein said one or more circuits is operable to executes said signaling mechanism between a transmitter and a receiver for each of said transmitted plurality of said MPDU fragments to co-exist with a distributed coordination function (DCF) mechanism for transporting said packets of data.

26. The system according to claim 19, wherein said one or more circuits is operable to adjusts a duration of a network allocation vector (NAV) of at least one of: a RTS NAV, a CTS NAV and a data NAV to protect said transmitted plurality of said MPDU fragments.

27. The system according to claim 19, wherein said one or more circuits is operable to appends a non-burstable MPDU to an end of said transmitted plurality of said MPDU fragments to terminate transmission of said transmitted plurality of said MPDU fragments.

* * * * *